United States Patent [19]

Daigle

[11] 4,312,235

[45] Jan. 26, 1982

[54] SENSOR AND METER FOR MEASURING THE MASS FLOW OF A FLUID STREAM

[75] Inventor: Louis J. L. Daigle, Manchester, Conn.

[73] Assignee: United Technologies Corporation, Hartford, Conn.

[21] Appl. No.: 183,486

[22] Filed: Sep. 2, 1980

[51] Int. Cl.³ .......................... G01F 1/28; G01F 1/78
[52] U.S. Cl. ............................................. 73/861.18
[58] Field of Search .................. 73/54, 59, 579, 32 A, 73/861.18, 861.21, 861.36, 861.37

[56] References Cited

U.S. PATENT DOCUMENTS

| | | | |
|---|---|---|---|
| 2,741,918 | 4/1956 | DeBoisblanc | 73/861.18 |
| 3,218,851 | 11/1965 | Sipin | 73/861.37 |
| 3,368,213 | 2/1968 | Quinn | |
| 3,426,593 | 2/1969 | Jacobs | 73/861.18 |
| 3,608,374 | 9/1971 | Miller | 73/32 X |
| 3,625,058 | 7/1971 | Endress | |
| 4,193,010 | 3/1980 | Kompanek | |

OTHER PUBLICATIONS

Rusnak et al., "Linear Momentum Flowmeter Design and Performance", in Flow, its Measurement and Control, 1974, pp. 871–883.

Klinger, "A New Engine Air Mass FLow Meter", in SAE Publication, 800469, 1980, pp. 1–5.

*Primary Examiner*—Herbert Goldstein
*Attorney, Agent, or Firm*—Stephen A. Schneeberger

[57] ABSTRACT

A flowmeter for measuring the mass flow of a fluid stream, such as air, in a duct includes a sensor and electronic circuitry. The sensor includes a drag surface mounted to or forming part of an oscillatory element and mounted in the fluid stream for flow-damped oscillation. The oscillatory element is stimulated by a drive transducer and a pickup transducer senses the flow-damped oscillations. An intermediate circuit terminates the drive at a certain peak amplitude and measures the time interval required for the amplitude of the flow-damped oscillations to decay a predetermined amount. That interval is indicative of the fluid mass flow.

The sensor may be a cantilevered beam. The beam may also be disposed behind a shroud and include a drag plate extending upstream of the shroud therefrom. The sensor may be a beam constrained to torsional oscillation about a longitudinal axis. The transducers are piezoelectric devices mounted on a beam in proximity with its neutral axis.

22 Claims, 10 Drawing Figures

SENSOR AND METER FOR MEASURING THE MASS FLOW OF A FLUID STREAM

TECHNICAL FIELD

This invention relates to the measurement of the mass flow of a fluid stream, and more specifically to a sensor and its incorporation in a meter for measuring the mass flow of a fluid stream, such as air, in a duct.

BACKGROUND ART

It is often desirable to accurately monitor or measure the mass flow of a fluid flowing through a duct, and various types of instruments have been developed for such purpose. Mass flow measurements have taken on particular significance with the rapidly increasing concern for optimizing the clean, efficient functioning of internal combustion engines, especially those which find application in automobiles and the like. Through an accurate determination and/or control of the mass flow of air to an engine, a more efficient proportioning and mixing of fuel with the air for subsequent combustion is possible. In such automotive applications, it is desirable that a suitable mass flow sensor and meter be accurate and particularly durable yet relatively inexpensively mass produced.

Devices for mass flow measurement of gases and liquids have been developed and extensively used in the chemical process industry. Many of these proven techniques are not applicable to measuring mass flow of air in the internal combustion engine. The primary reason for this is that many of the devices require auxiliary sensors (e.g., vortex shedding meters, rotameters) to provide measurements from which mass flow can be calculated.

In one automotive application, an ultrasonic transducer senses air velocity which is then used in conjunction with a pressure sensor to compute mass flow. In another such application, a hot wire sensor has been considered for directly measuring mass flow.

A mass flowmeter which may meet some of the foregoing criteria is described in an article entitled "Linear Momentum Mass Flowmeter Design and Performance" by Rusnak, Wuori and Minell appearing at page 871 in FLOW, ITS MEASUREMENT AND CONTROL IN SCIENCE AND INDUSTRY, Instrument Society of America, copyright 1974. In the flowmeter described, the sensor included a dualsyn transducer, a torsional spring, and a drag body which was introduced to the flow stream. The dualsyn transducer is an inductive-type device with both torque and rate windings on the same stack. The torque winding is driven to cause oscillation of a rotor shaft having the drag body mounted thereon. The mass flow of air or other fluid past the drag body serves to damp the oscillations of the rotor, which damped oscillations are sensed and fed back via the rate windings. Circuitry intermediate the feedback rate winding and torque, or driving, winding operates to maintain the amplitude of the systems oscillations at a constant value. Thus, as the system damping increases due to an increase in the mass flow of the fluid, the loop gain is automatically increased to sustain the oscillation. It will be recognized that the rotary mechanism of such a sensor may be unduly complex and delicate for utilization in various automotive applications.

U.S. Pat. No. 3,368,219 issued Feb. 6, 1968 to C. E. Quinn for Liquid Level Indicator and U.S. Pat. No. 3,625,058 issued Dec. 7, 1971 to G. H. Endress et al for Apparatus for Determining the Filling Level of a Container, each describe devices which utilize electrically driven and sensed vibrating elements for determining the level of liquid or other fluid in a container. Magnetic or piezoelectric means are employed to drive the vibratory element at its natural frequency and corresponding electromagnetic or piezoelectric pickup means sense the existence and amplitude of such vibrations and apply them in a feedback manner to control the drive means. Generally speaking, other circuitry detects whether or not the predetermined amplitude of vibrator oscillations is occurring and utilizes such determination as an indication that the contained fluid has or has not reached a certain level. These devices do not, however, provide an indication of fluid mass flow.

Yet another patent, U.S. Pat. No. 4,193,010 issued Mar. 11, 1980 to H. W. Kompanek for Sensor Device Using Piezoelectric Coating Subjected to Bending discloses a bendable sensing element having a piezoelectric coating thereon and a pair of electrodes affixed thereto for respectively vibrating and sensing the vibrations of the bendable element. As in the instance of the sensors described in the two aforementioned patents, this sensor is also connected to circuitry for detecting a characteristic vibrational frequency or amplitude of the sensor to indicate contact or noncontact with various materials so as to determine the presence thereof.

A relatively simple and inexpensive yet durable device is needed which can quickly and accurately determine the mass flow of a fluid such as air through a duct, particularly in automotive applications.

DISCLOSURE OF INVENTION

It is a principal object of the present invention to provide a relatively simple, inexpensive and durable mass flowmeter for quickly and accurately determining the mass flow of a fluid, such as air, in a duct, particularly in automotive applications.

It is a further object of the present invention to provide a sensor especially suited for use in a mass flowmeter in accordance with the invention.

In accordance with the present invention, there is provided a flowmeter for measuring the mass flow of a fluid stream in a duct. The meter includes a sensor and electronic circuitry. The sensor includes a base, oscillatory means, such as a cantilevered beam, or the like, supported by and adapted for oscillatory motion relative to the base, and drive and pickup transducers associated with the beam member. The base is mounted in a fixed position relative to the duct, with the beam member extending into the fluid stream for flow damped oscillation therewithin. The drive transducer responds to an electrical input signal for stimulating oscillatory motion of the beam member and the pickup transducer provides an electrical output signal indicative of the flow damped oscillations of the beam member. The circuitry applies an input signal to the drive transducer to stimulate the beam member to a preselected peak amplitude of oscillation and then removes the input drive signal. The circuitry is similarly connected to the pickup transducer, and in a preferred arrangement subsequently determines the time interval required for the amplitude of the beam member oscillations to decay from a predetermined upper threshold value no greater than the initial preselected peak oscillation amplitude to a predetermined lower threshold value.

More specifically, the predetermined upper threshold value is slightly less than the peak oscillation amplitude so as to ensure adequate signal levels to the threshold detectors even though transducer sensitivities may vary over the operating temperature range that can be expected. When the oscillation amplitude has decayed to a minimum no greater than, and preferably equal to, the lower threshold, the circuitry reapplies the electrical input signal to the drive transducer for initiating a new measuring cycle. This cyclical operation may be conducted at a relatively high frequency or repetition rate for closely following and indicating changes in the fluid mass flow rate. The decay interval determined by the circuitry is substantially inversely proportional to the mass flow of the fluid, as will be hereinafter explained, such that an output signal directly representative of the mass flow is conveniently provided.

In accordance with another aspect of the invention, there is provided a sensor particularly suited for measuring the mass flow of a fluid stream such as air in a duct. As described above, the sensor comprises a base and an oscillatory beam member supported, as by cantilevering, by the base. The drive transducer and the pickup transducer are piezoelectric devices affixed to the beam member for respectively stimulating and sensing the flow-damped oscillatory motion of the beam. The beam member includes a neutral axis extending longitudinally thereof and the piezoelectric drive and pickup transducers are each affixed to the beam member in close proximity to the neutral axis to minimize the residual mechanical damping of the beam member occasioned by the connection of the transducers with the member. Specifically, the beam member includes a pair of recesses therein on the opposite surfaces thereof and on opposite sides of and in close proximity to the neutral axis, with the drive transducer being mounted in one of the recesses and the pickup transducer being mounted in the other.

In one embodiment of the sensor, the beam member is substantially shielded from the fluid flow, as by means of a tubular shroud disposed therearound, and a drag plate, such as a disc, is positioned upstream of the shroud and beam member by means of a rigid support extending from the beam member through an opening in the shroud. With this arrangement, the beam member is substantially shielded from the fluid stream and the system interaction is instead concentrated at the drag plate. Also, by minimizing the thickness of this drag plate in the direction of flow, good correlation of the actual drag coefficient with that predicted may be obtained even at relatively low Reynolds number flow conditions.

In another embodiment of the sensor, the oscillatory portion thereof comprises an elongated member supported and constrained so as to only allow oscillatory rotary motion about its longitudinal axis. The elongated member is arranged such that when positioned in the fluid duct it is disposed with its longitudinal axis extending normal to the direction of fluid flow and includes a drag surface disposed normal to the direction of fluid flow.

BEST MODES FOR IMPLEMENTING THE INVENTION

Initially, consideration will be given to the regime of equations of motion upon which the present oscillating beam mass flow sensor and meter are premised. The equations of motion are obtained by modeling the sensor as a spring mass damper system in an airstream. A body in an airstream will be subjected to a pressure drag force given by $$F_D = \tfrac{1}{2} C_D \rho A V_o^2 \tag{1}$$

where $C_D$ is the drag coefficient of the body, $\rho$ is the density of air, A is the area of the body normal to flow and $V_o$ is the relative velocity between the body and the airstream. Its equation of motion is $$M\ddot{X} + D\dot{X} + KX = F(t) \tag{2}$$

where F(t) is an applied force, M is the mass of the body, K is the spring constant, and D is the internal viscous damping factor. If the system described by Eq. (2) is placed in an airstream which is moving at velocity V, the drag force acting on the body will appear as an external force given by $$F_D = \tfrac{1}{2} C_D \rho A [V + \dot{X}]^2 \tag{3}$$

From Eqs. (2) and (3) the equation of motion for a spring mass damper system acted on by a pressure drag force is $$M\ddot{X} + (D + C_{Dp}AV)\dot{X} + KX = F(t) - \tfrac{1}{2} C_D \rho A [V^2 + \dot{X}^2] \tag{4}$$

For peak oscillation velocities small compared with the airstream velocity V Eq. (4) can be accurately expressed as $$M\ddot{X} + (D + C_{Dp}AV)\dot{X} + KX = F(t) - \tfrac{1}{2} C_D \rho A V^2 \tag{5}$$

which shows that the effect of the drag force is to modify the mechanical damping by a term proportional to the mass flow in the airstream. Therefore, a measurement of the total damping can be used to indicate mass flow. The validity of the approach is dependent on satisfying three conditions. These are:

(1) substantially constant drag coefficient
(2) substantially constant internal mechanical damping
(3) peak oscillation velocities much less than the flow velocity Developing the equations further, Eq. (5) can be represented in classic form by dividing both sides by M $$\ddot{X} + (2\delta\omega)\dot{X} + \omega^2 X = \frac{F(t) - \frac{1}{2}C_D\rho AV^2}{M} \quad (6)$$

where $\omega$ is the natural frequency of the beam $$\omega = \frac{K}{M}^{\frac{1}{2}} \quad (7)$$

where $\delta$ is the total damping ratio $$\delta = \frac{D + C_D\rho AV}{2(MK)^{1/2}} \quad (8)$$

The total damping is the sum of the mechanical damping ratio $$\delta_M = \frac{D}{2(MK)^{1/2}} \quad (9)$$

and a flow related component $$\delta_F = \frac{C_D A}{2(MK)^{1/2}}(\rho V) \quad (10)$$

Which shows that the mass flow, $\rho V$, is proportional to the flow dependent damping ratio.

Figure 1:
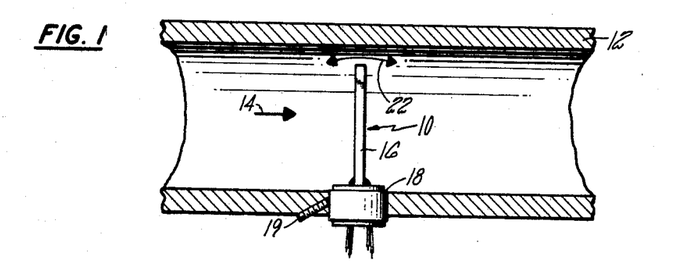
FIG. 1 is a side elevation view, partly in section, illustrating one embodiment of the mass flow sensor of the invention operatively positioned within a fluid duct.
Figure 2:
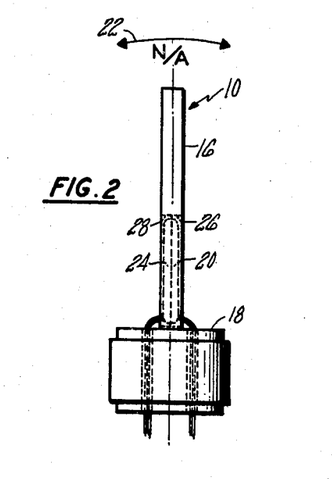
FIG. 2 is an enlarged view of the sensor of FIG. 1.
Figure 3:
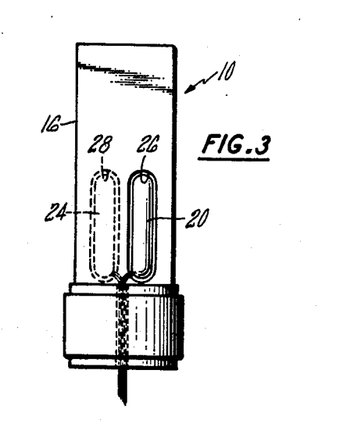
FIG. 3 is a front elevation view of the sensor of FIG. 2.

Referring generally to FIGS. 1-3 and specifically to FIG. 1, there is illustrated a sensor 10 for use in measuring the mass flow of a stream of fluid in a duct 12. The fluid, which in the illustrated embodiment is air, is flowing in the direction indicated by arrow 14. Sensor 10 finds particular application in measuring the mass flow of air being delivered to a carburetor or combustion chamber to control fuel metering or the like in automotive and other applications.

Sensor 10 comprises an oscillatory or vibratory element, such as cantilevered beam member 16, supported by a base member 18. The base 8 and cantilevered beam 16 may be formed as a single unit, as by being machined from an aluminum blank. The base 18 may take any form suitable for fixed mounting in and through the wall of duct 12. In the illustrated embodiment, base 18 is a circular member sized for close-fitting insertion into an opening in the wall of duct 12 where it is held fixedly positioned by a set screw 19, threads and/or other suitable means. The beam member 16 cantilevered from base portion 18, extends into duct 12 transversely of the direction of airflow 14. The beam is caused to oscillate or vibrate by means of an electrically driven transducer, preferably a piezoelectric crystal 20 affixed to the beam. As illustrated in FIGS. 2 and 3, the thickness of beam 16 in the direction of fluid flow 14 is considerably less than its length and width transversely thereof. Accordingly, the drive transducer 20 when electrically driven causes the beam to oscillate or vibrate in the direction of fluid stream 14, as indicated by double-headed arrow 22.

A sensing or pickup transducer, such as piezoelectric crystal 24 is also associated with beam member 16 for providing an electrical signal indicative of the amplitude and frequency of the beam's oscillations.

The length of beam member 16 beyond base 18, as well as its thickness, density and the Young's modulus of the assembly are determinative of the natural or resonant frequency of the sensor configuration. In the illustrated embodiment, beam 16 has a length of about 2.25 in., a width of about 0.75 in., is about 0.15 in. thick and possesses a resonant frequency of about 800 Hz. It will be understood that the resonant frequency of the beam member may be considerably increased or decreased as desired, by altering the aforementioned parameters. Moreover, as will be hereinafter discussed in greater detail, beam 16 may be considerably thinner (factor of 3 or more) than the above stated thickness to enhance correlation of its actual drag coefficient with theoretical drag coefficient.

The piezoelectric crystals 20 and 24 are affixed to the beam 16 using a suitable commercially available strain gage epoxy. The performance of the sensor is enhanced by locating crystals 20 and 24 as near as possible to the neutral axis N/A. Neutral axis N/A may be a line or a plane, extending through the length of the beam 16 usually along its midline or midplane as measured from front-to-rear in the direction 22 of plane oscillation. The tensile and compressive forces on the beam as it oscillates are a minimum at the neutral axis N/A. By so locating the crystals, the residual mechanical damping of the system occasioned by the crystals bonded to the beam is believed to be reduced. The shear stresses imposed on the crystals by the vibrating beam 16 are minimized by placing them near the neutral axis. Such minimization of shear stress on the crystals minimizes, and thus reduces, the residual or inherent damping in the mechanical system itself. Accordingly, a pair of recesses 26 and 28 are formed in the beam member 16 on opposite surfaces thereof and are positioned and of such depth into the beam that the region of juncture between the transducers 20 and 24 and the beam via the epoxy bond is substantially at or in close proximity with the neutral axis N/A.

The beam 16 of the FIGS. 1-3 embodiment has a relatively large surface area presented to the fluid flow, which surface area comprises the drag member interacting with the flowing fluid. The area of this drag surface is relatively large, particularly in comparison to the total cross section of the duct 12 through which the fluid is flowing. While the determined fluid mass flow using this sensor bears relatively close correlation with the actual value, an even closer correlation is observed utilizing the enshrouded sensor 30 of FIG. 4.

Figure 4:
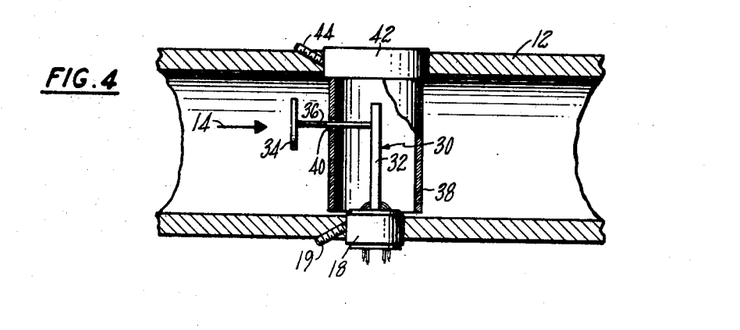
FIG. 4 is a view similar to FIG. 1 illustrating another embodiment of the sensor.

As in the FIG. 1 embodiment, a sensor base portion 18 of the FIG. 4 embodiment is mounted in an opening in the wall of duct 12 and secured therein by means of a set screw 19 or the like. The vibrating beam member 32 cantilevered from base portion 18 may be substantially identical to the beam member 16 of FIG. 1 including the positioning of a pair of piezoelectric drive and pickup transducers, except that it includes a drag plate, such as disc 34 rigidly affixed thereto via rigid support rod 36. A cylindrical, open-ended shroud 38 encircles beam member 32 and includes an opening or port 40 in the wall thereof. Shroud 38 is affixed to and depends from a base portion 42 mounted in an opening in the wall of duct 12 in a manner similar to the sensor base portion 18, as by means of set screw 44 or the like.

The disc 34 is of considerably smaller area relative to the cross-sectional area of 4 inch diameter duct 12 than was the drag surface area of beam member 16 in FIG. 1. For instance, disc 34 may be 0.005 in. thick and 0.75 in. in diameter, its area being less than 5% of that of duct 12. Disc 34 is positioned upstream of beam member 32 relative to fluid flow 14 by means of support rod 36 affixed thereto and extending therebetween. Disc 34 may be bonded to one end of support rod 36, and the other end of the rod may be threaded for threaded engagement with beam member 32 near its upper end after shroud 38 has been placed in position around the beam member.

Although shroud 38 is illustrated as a full cylinder, it will be understood that it may be less and need only shield the beam member 32 from the forces of the flowing fluid represented by arrow 14. The port or opening 40 in shroud 38 is preferably only large enough to permit free passage therethrough of the disc support rod 36 so as to minimize transmission of flowing fluid therethrough and against beam 32.

In addition to disc 34 having a small cross sectional area relative to that of the duct, its thinness i.e., 0.005 in. is also believed to be an important factor in enhanced performance of the sensor. The drag coefficient of the drag member, be it a small disc or the cantilevered beam, will remain relatively constant if the flow which separates at the leading edge of the member is prevented from reattaching at some point along the thickness of that member, as by making the member relatively thin to prevent such reattachment even at relatively low Reynolds numbers. The FIG. 4 embodiment demonstrates a particularly close correlation between theoretical and actual drag coefficients over a range of mass flow having Reynolds numbers in the range of about 5,000-23,000, with some deviation at lower Reynolds numbers. Therefore, the drag member preferably is sufficiently thin that the flow does not reattach along its thickness for even low Reynolds numbers in the mass flow range of interest.

Figure 5:
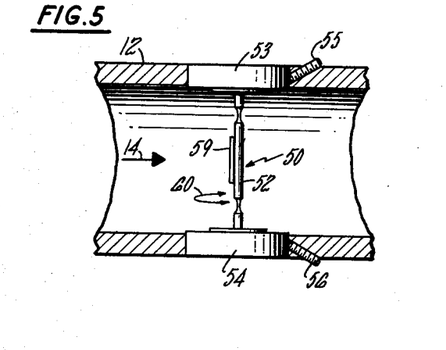
FIG. 5 is a view similar to FIG. 1 illustrating yet another embodiment of the sensor.
Figure 6:
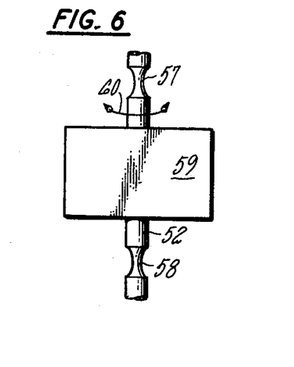
FIG. 6 is an enlarged partial front elevation view of the sensor of FIG. 5.

Referring to FIGS. 5 and 6, yet another embodiment of a mass flow sensor in accordance with the invention is illustrated. The sensor 50 comprises an elongated beam member 52 affixed to and constrained by base members 53 and 54 at opposite ends thereof. The base members 53 and 54 are similar to the base members 18 in the FIG. 1 and FIG. 4 embodiments and are respectively mounted in a pair of openings in diametrically opposite sides of duct 12, as by set screws 55 and 56 respectively. The beam member 52 which may be of substantially any cross-sectional configuration, is preferably rigidly affixed at each end to the base members 53 and 54 such that it linearly spans much of the width or diameter of duct 12. Beam 52 is relieved, as by notches, to effectively create torsional flexures 57 and 58 near opposite ends thereof, sufficient to allow rotation of the beam through a limited angle about its longitudinal axis in response to certain torsional forces applied thereto. A drag plate 59 rigidly affixed to beam member 52 serves as the drag element for interacting with fluid flow 14 in the manner heretofore described.

Because beam member 52 is constrained against all degrees of movement except through a limited angle, about its longitudinal axis, as represented by double headed arrow 60, a suitable pair of drive and pickup piezoelectric transducers mounted on the beam member (not shown) are capable of inducing and sensing only the torsional motion represented by arrows 60. As with the oscillations of sensors 10 and 30 in FIGS. 1 and 4 respectively, the rotary oscillations 60 of sensor 50 are damped in accordance with the mass flow 14 of the fluid in the duct. Sensor 50 is particularly suitable for applications in which translational forces externally of but impacting on the sensor system should not affect the operation of the sensor system. For instance, such translational forces might be encountered in an automotive application when an automobile passes over a bump.

It will be understood that drag plate 59 of sensor 50 might be omitted if the cross sectional area of beam 52 is sufficiently large to serve that function and alternatively, that the normal width and thickness of beam member 52 may be sufficiently small that it is capable of limited rotary oscillation without relief notches 57 and 58.

For a vibrating body with a constant or substantially constant drag coefficient, such as beam members 16, 32 and 52, the effect of mass flow around the body is to increase the damping of the vibration in proportion to mass flow as previously explained. By applying the electrical output of the pickup transducer to the electrical input of the drive transducer via a variable gain amplifier, certain prior art mass flowmeters have utilized the gain necessary to maintain the amplitude of sensor oscillations constant as an indication of system damping and ultimately, the mass flow. In accordance with one aspect of the present invention, the pickup and drive transducers are interconnected in an improved manner to provide an indication of mass flow which is not sensitive to changes in the transducers due to aging or temperature.

The meter of the present invention measures the sensor's damping ratio by measuring the decay time of its oscillations. The damping ratio is then utilized to determine mass flow. The following represents the theoretical support for this technique.

Energy is introduced to the beam by applying a force in phase with the sensed velocity of the beam. This results in a rapid buildup of the level of oscillation. The oscillation envelope is detected and when this exceeds a fixed threshold value the force is removed. The measured envelope response following removal of the force is given by $$X_E(t) = X(t_o) \cdot G_P e^{-\delta \omega t} \quad (11)$$

where $X(t_o)$ is the amplitude of the oscillation envelope at time $t_o$ when the force is removed and $G_P$ is the sensitivity of the pickup transducer and processing electronics. The decay time measurement consists of determining the elapsed time for the response of Eq. 11 to pass from an upper threshold value $X_1$ to a lower threshold value $X_2$. The upper threshold is crossed at time $t_1$ and $$X_E(t_1) = X_1 = X(t_o) \cdot G_P e^{-\delta \omega t_1} \quad (12)$$

and at $t_2$ the lower threshold is crossed and $$X_E(t_2) = X_2 = X(t_o) \cdot G_P e^{-\delta \omega t_2} \quad (13)$$

Dividing Eq. 12 by Eq. 13 gives $$X_1/X_2 = e^{\delta \omega (t_2 - t_1)} = e^{\delta \omega \Delta t} \quad (14)$$

Since $\delta$ is the sum of $\delta_M$ and $\delta_F$, Eq. 14 can be solved for $\delta_F$ $$\delta_F = \frac{\ln(X_1/X_2)}{2\pi \omega \Delta t(\delta_F)} - \delta_M \quad (15)$$

Under no flow conditions the decay time is dependent on the mechanical damping ratio $$\Delta t(o) = \frac{\ln(X_1/X_2)}{2\pi \omega \delta_M} \quad (16)$$

which can be used with Eq. 15 to give $$\delta_F = \delta_M \left[ \frac{\Delta t(o)}{\Delta t(\delta_F)} - 1 \right] \quad (17)$$

Therefore, from Eq. 17 and Eq. 10 it follows that $$\rho V = \frac{2(MK)^{1/2}\delta_M}{C_D A} \left[ \frac{\Delta t(o)}{\Delta t(\delta_F)} - 1 \right] = C_1 \left[ \frac{\Delta t(o)}{\Delta t(\delta_F)} - 1 \right] \quad (18)$$

where $C_1$ is a constant which is determined by the physical constants of the beam, $\delta_F$ is the flow related damping ratio, $\Delta t(\delta_F)$ is the measured decay time and $\Delta t(o)$ is the decay time under no flow conditions. As shown by Eq. 15 and Eq. 16, the decay times are independent of the sensitivity of the beam transducers but are dependent on the mechanical damping of the beam.

Figure 7:
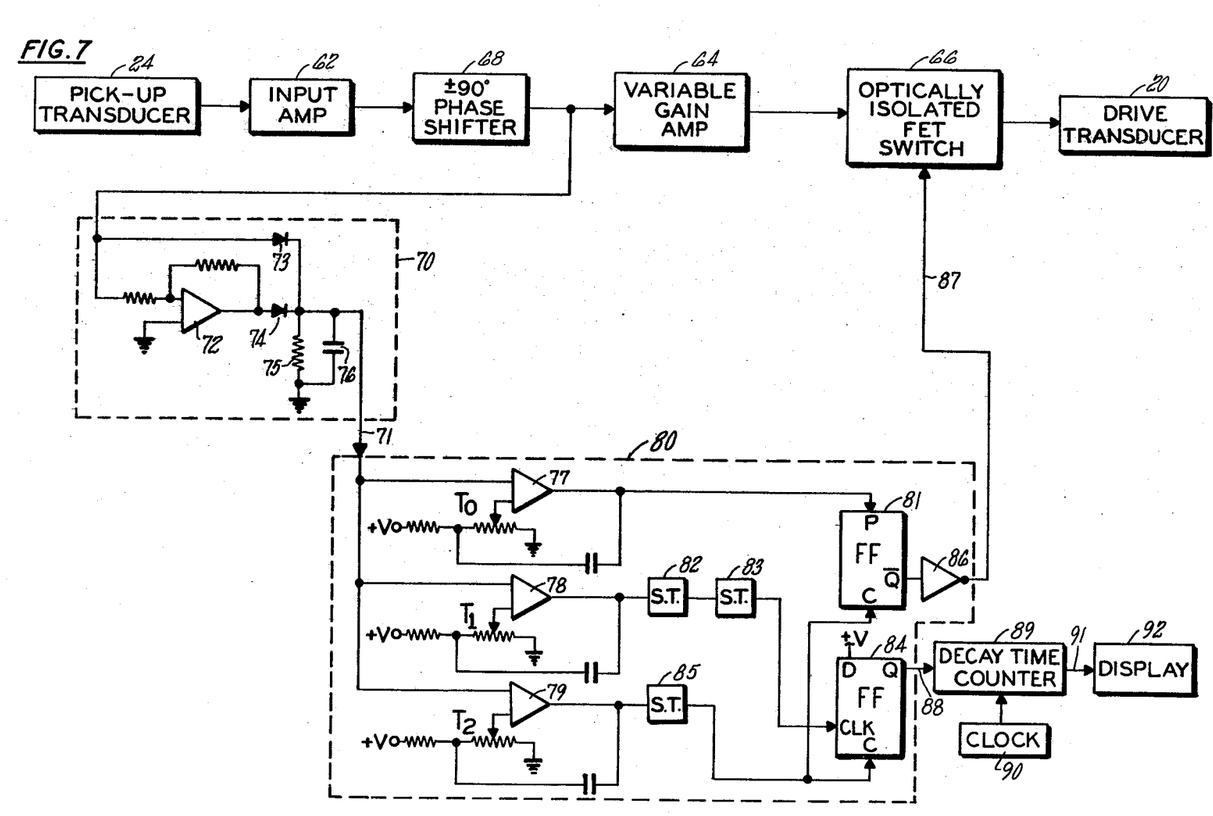
FIG. 7 is a partly block and partly schematic diagram of the circuitry associated with the mass flowmeter of the invention.

Referring to FIG. 7, there is illustrated circuitry which may be associated with any of the aforementioned sensors to complete a meter capable of indicating fluid mass flow based on a decay time measurement or so-called logarithmic decrement technique. As previously mentioned, the pickup transducer 24 detects the mechanical oscillations of the sensor and transduces them to an electrical signal having an amplitude and frequency corresponding to that of the mechanical system. This electrical signal is amplified by input amplifier 62 and variable gain amplifier 64 for selective connection through switch 66 to the drive transducer 20 for stimulating the desired amplitude of sensor oscillation. A phase shift circuit 68 capable of adjusting the phase of the signal within a range of ±90°, is interposed between amplifiers 62 and 64 to compensate or offset any phase shifts occasioned by the mechanical aspects of the sensor system. With the drive signal thus in phase with the velocity of the sensor oscillation, as sensed at pickup transducer 24, a negative damping ratio is produced during excitation of transducer 20. This leads to a rapid buildup in the level or amplitude of oscillation of beam member 16.

The drive electronics are structured to alternately excite the beam member to a preset level of oscillation and then to deenergize it to allow for the measurement of the time interval required for the level of oscillations to decay from one threshold to another. Subsequent repetitive reenergization and deenergization the drive electronics permits the mass flow to be continuously monitored. This mode of operation elminates system drift which closed loop vibration control of the prior art was not able to compensate for.

Figure 8A:
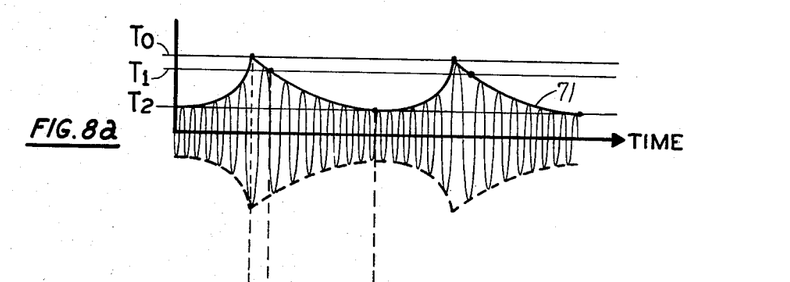
FIGS. 8a, 8b and 8c comprise wave forms and timing diagrams associated with the circuitry of FIG. 7.

Accordingly, the sensed signal provided by pickup transducer 24 is extended, as from the output of phase shifter 68, to envelope detection circuitry 70 providing an output signal on line 71 which substantially represents the "amplitude envelope" of the positive oscillations of the sensor. A phase inverter 72 "folds" the negative oscillations of the sensor such that they instead also appear positive, which oscillations are then unidirectionally conducted through diodes 73 and 74 to a peak detection circuit comprised of resistor 75 and capacitor 76 connected in parallel. The RC time constant of this circuit is selected such that the charging and discharging rate of capacitor 76 is substantially slower than the frequency of the sensor oscillations but is sufficiently fast to track the maximum rate of change anticipated for the "envelope" of those oscillations. FIG. 8a depicts the voltage waveform of the oscillation envelope appearing on line 71 of FIG. 7.

The envelope signal on line 71 is extended to respective inputs of comparators 77, 78 and 79 of threshold circuitry 80. The other input of comparator 77 is a reference voltage $T_o$, the value of which corresponds with the maximum oscillation amplitude to which the sensor is driven. The other input to comparator 78 is a reference voltage $T_1$, which is near but preferably somewhat less than the voltage $T_o$, for indicating the upper threshold from which a decay-interval measurement is initiated. The other input to comparator 79 is a reference voltage $T_2$, the magnitude of which corresponds with the lower threshold to which the oscillation envelope is allowed to decay before terminating the decay-interval measurement.

The output of the $T_1$ comparator 77 is normally high and goes low only when the envelope amplitude on 71 positively exceeds $T_o$. The output of comparator 77 is applied to the PRESET input of flip-flop 81. The output of $T_1$ comparator 78 is low so long as the envelope amplitude 71 postively exceeds $T_1$, and goes high when and while that condition is reversed. The output of comparator 78 is extended through a pair of wave shaping and double phase-inverting Schmitt triggers 82 and 83 to the CLOCK input of flip-flop 84. The output of $T_3$ comparator 79 is low so long as the envelope amplitude 71 postively exceeds the $T_2$ level and goes high only when and while that condition is reversed. The output of comparator 79 is extended through a phase inverting and wave shaping Schmitt trigger 85 to the CLEAR inputs of flip-flops 81 and 84 respectively. A positive, or "high", voltage "+V" is applied to the D input of flip-flop 84.

Figure 8B:
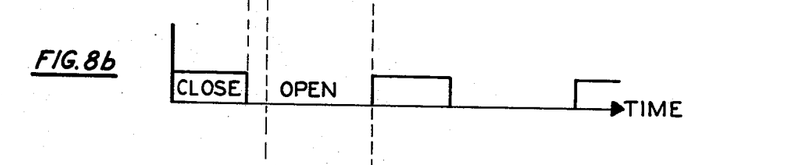

Flip-flop 81 is edge-triggered by a negative going step and thus its $\overline{Q}$ output on line 87 following inversion by inverter 86, comprises a gating signal. The gating signal on line 87 is depicted in FIG. 8b and is high, or enabling, until the oscillation envelope amplitude briefly exceeds to whereupon it goes low and remains disabling until again being switched high by the envelope oscillation amplitude decaying, briefly, below $T_2$. The gating signal on line 87 controls optically-isolated FET switch 66 such that the oscillation signals of pickup transducer 24 are intermittently passed to the drive transducer 20 for rebuilding the amplitude of oscillations of the sensor.

Figure 8C:
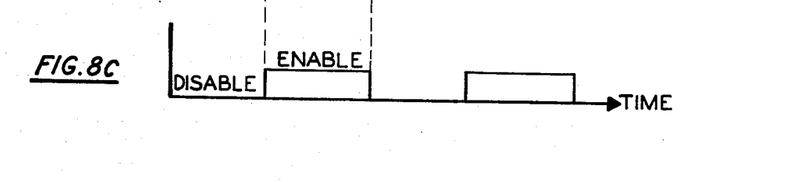

When switch 66 is opened by the oscillation amplitude reaching level $T_o$, those oscillations begin to decay at a rate determined by the flow damping of the sensor. The Q output of flip-flop 84, represented by line 88 extended to a decay-time counter 89, is in a low, or disabling, mode for the counter until the $T_1$ transition appears at the CLOCK input of the flip-flop. Thereafter output signal 88 remains high until driven low by the $T_2$ threshold extended to the CLEAR input of flip-flop 84. Thus, the input gate to decay-time counter 89 is enabled during the interval in which the oscillation envelope amplitude declines from $T_1$ to $T_2$, and is disabled thereafter while the envelope is restored to its $T_o$ amplitude and decays slightly to $T_1$, as illustrated in the waveform of FIG. 8c.

A 1 MHz clock 90 extended to the clocking input of counter 89 drives that counter during the enabled interval from $T_1$ to $T_2$ in each cycle. The count output 91 of counter 89 cyclically provides an accurate measure of the interval required for the oscillation envelope to decay from threshold $T_1$ to $T_2$, which interval is inversely proportional to and thereby indicative of the mass flow of the fluid passing through duct 12 as previously described. The interval measure signal 91 may be converted, through appropriate circuitry associated with display 92, to a direct reading of fluid mass flow. This reading, or the electrical signal therefor, may then be utilized in a variety of manners, as for controlling the metering of fuel in an internal combustion engine or the like.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A mass flowmeter for measuring the mass flow of a fluid stream in a duct, comprising:
sensor means having a base and oscillatory means supported by and adapted for oscillatory motion relative to said base, said base being adapted to be fixedly positioned relative to said duct such that at least part of said oscillatory means extends into the duct for flow-damped oscillation in the fluid stream therewithin, said oscillatory means including drive transducer means responsive to an electrical input signal for stimulating oscillatory motion thereof and pickup transducer means for providing an electrical output signal indicative of the flow-damped oscillations thereof; and
electronic circuit means being operatively connected to said drive transducer means for applying an electrical input signal thereto to stimulate said oscillatory means to a peak amplitude of oscillation and for removing said input signal and being operatively connected to said pickup means for subsequently determining the interval required for the amplitude of said oscillations to decay from a predetermined upper threshold value no greater than said peak oscillation amplitude to a predetermined lower threshold value, said determined interval being indicative of the mass flow of said fluid.

2. The mass flowmeter of claim 1 wherein said determined interval is substantially inversely proportional to the mass flow rate of said fluid and said circuit means is further responsive to provide an output signal directly representative of said mass flow.

3. The mass flowmeter of claim 1 wherein said predetermined upper threshold value is slightly less than said peak oscillation amplitude.

4. The mass flowmeter of claim 1 wherein said circuit means additionally detects when said oscillation amplitude has decayed to a minimum amplitude no greater than said lower threshold and reapplies said electrical input signal to said drive means for initiating a new cycle for the determination of mass flow.

5. The mass flowmeter of claim 4 wherein said minimum oscillation amplitude is substantially the same as said lower threshold value.

6. The mass flowmeter of claim 5 wherein the fluid of said fluid stream is air.

7. The mass flowmeter of claim 6 wherein said drive and pickup transducer means are respective piezoelectric devices affixed to said oscillatory means.

8. The mass flowmeter of claim 7 wherein said oscillatory means comprises a beam member cantilevered from said base and including a drag plate affixed thereto for orientation normal to the direction of fluid flow in the duct, and further including shroud means adapted to be statically connected relative to said duct for substantially shielding said beam member from and exposing said drag plate to the fluid stream in the duct.

9. The mass flowmeter of claim 8 wherein the thickness of said drag plate is sufficiently thin that the fluid flow which separates at the leading edge of the drag plate is prevented from reattaching thereto along its thickness for fluid mass flows having Reynolds numbers as low as about 5,000.

10. A sensor for use in measuring the mass flow of a fluid stream in a duct, comprising:
means having a base and an oscillatory beam member supported by and adapted for oscillatory motion relative to said base, said base being adapted to be fixedly positioned relative to said duct such that at least part of said beam member extends thereinto for flow-damped oscillation in the fluid stream therewithin, said beam member including piezoelectric drive means affixed thereto and responsive to an electrical input signal for stimulating oscillatory motion thereof and piezoelectric pickup means affixed thereto for providing an electrical output signal indicative of the flow-damped oscillations thereof.

11. The sensor of claim 10 wherein said oscillatory beam member is supported in cantilever fashion by said base.

12. The sensor of claim 11 wherein said beam member includes a neutral axis extending longitudinally thereof and wherein said piezoelectric drive means and said piezoelectric pickup means are each affixed to said beam member in close proximity to said neutral axis thereof thereby to minimize the residual mechanical damping of said member occasioned by the connection of said drive means and pickup means with said member.

13. The sensor of claim 12 wherein said beam member includes a pair of recesses therein each in close proximity to said neutral axis, said piezoelectric drive means being mounted in one of said recesses and said piezoelectric pickup means being mounted in the other of said recesses, each in close proximity to said neutral axis.

14. The sensor of claim 13 wherein said beam member recesses are in opposite surfaces of said beam member.

15. The sensor of claim 10 wherein said beam member includes a drag plate affixed thereto for orientation normal to the direction of fluid flow in the duct, and further including shroud means adapted to be statically connected relative to said duct for substantially shielding said beam member from and exposing said drag plate to the fluid stream in the duct.

16. The sensor of claim 15 wherein said drag plate comprises a disc, said disc being spaced from said beam member by a connecting element and said shroud means comprises a tubular member having a port, said tubular member encircling said beam member with said connecting element extending through said port to position said disc externally of said tubular member.

17. The sensor of claim 16 wherein the fluid in said fluid stream is air.

18. The sensor of claim 10 wherein said oscillatory beam member is supported at longitudinally opposite ends and is constrained to only allow oscillatory rotary motion about its longitudinal axis, said beam member being adapted to be disposed with its longitudinal axis extending normal to the direction of fluid flow in the duct and having a drag surface disposed normal to said direction of fluid flow.

19. A sensor of claim 10 wherein the thickness of said part of the beam member extending into the fluid stream in the duct is sufficiently thin that the fluid flow which separates at the leading edge of the member is prevented from reattaching thereto along its thickness for fluid mass flows having Reynolds numbers as low as about 5,000.

20. The sensor of claim 15 wherein the thickness of said drag plate is sufficiently thin that the fluid flow which separates at the leading edge of the drag plate is prevented from reattaching thereto along its thickness for fluid mass flows having Reynolds numbers as low as about 5,000.

21. The sensor of claim 20 wherein the area of said drag plate is no greater than about 5% of the area of said duct measured perpendicular to the direction of fluid flow in said duct.

22. The sensor of claim 15 wherein the area of said drag plate is no greater than about 5% of the area of said duct measured perpendicular to the direction of fluid flow in said duct.

* * * * *